United States Patent
Cheng (10) Patent No.: US 11,379,099 B2
(45) Date of Patent: Jul. 5, 2022

(54) METHOD AND DEVICE FOR SELECTING TEXT IN ELECTRONIC TERMINAL

(71) Applicant: Samsung Electronics Co., Ltd., Suwon-si (KR)

(72) Inventor: Zhibiao Cheng, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/982,496

(22) PCT Filed: Nov. 15, 2018

(86) PCT No.: PCT/KR2018/013957
§ 371 (c)(1),
(2) Date: Sep. 18, 2020

(87) PCT Pub. No.: WO2020/101067
PCT Pub. Date: May 22, 2020

(65) Prior Publication Data
US 2021/0365163 A1    Nov. 25, 2021

(51) Int. Cl.
G06F 3/048      (2013.01)
G06F 3/0484     (2022.01)
G06F 40/166     (2020.01)
G06F 3/04883    (2022.01)

(52) U.S. Cl.
CPC ........ *G06F 3/0484* (2013.01); *G06F 3/04883* (2013.01); *G06F 40/166* (2020.01)

(58) Field of Classification Search
CPC ... G06F 3/0484; G06F 40/166; G06F 3/04883
See application file for complete search history.

(56) References Cited

U.S. PATENT DOCUMENTS 8,656,296 B1    2/2014   Ouyang et al.
9,804,777 B1 * 10/2017   Ouyang ............... G06F 40/166
(Continued)

FOREIGN PATENT DOCUMENTS

| KR | 10-2016-0068265 A | 6/2016 |
| KR | 10-1677636 B1     | 11/2016 |
| KR | 10-2017-0133776 A | 12/2017 |

OTHER PUBLICATIONS

International Search Report dated Aug. 12, 2019 in connection with International Patent Application No. PCT/KR2018/013957, 2 pages.
(Continued)

*Primary Examiner* — Mahelet Shiberou (57) ABSTRACT

The present disclosure provides a method and a device for selecting a text in an electronic terminal, and the method includes: receiving an operation for entering a text selection mode and entering the text selection mode; displaying a start marker for indicating a start position of the selected text, an end marker for indicating an end position of the selected text, a start guideline which refers to a straight line passing through the start position and extending along a character direction in the text within a predetermined range, and an end guideline which refers to a straight line passing through the end position and extending along a character direction in the text within a predetermined range.

14 Claims, 3 Drawing Sheets

(56) References Cited

U.S. PATENT DOCUMENTS

| | | | |
|---|---|---|---|
| 2009/0228842 A1* | 9/2009 | Westerman | G06F 40/166 715/863 |
| 2015/0007016 A1* | 1/2015 | Lee | G06F 3/0485 715/234 |
| 2017/0329428 A1 | 11/2017 | Seong et al. | |
| 2019/0187889 A1* | 6/2019 | Moon | G06F 3/04883 |

OTHER PUBLICATIONS

Written Opinion of the International Searching Authority dated Aug. 12, 2019 in connection with International Patent Application No. PCT/KR2018/013957, 4 pages.

* cited by examiner

METHOD AND DEVICE FOR SELECTING TEXT IN ELECTRONIC TERMINAL

CROSS-REFERENCE TO RELATED APPLICATION

This application is a 371 of International Application No. PCT/KR2018/013957 filed on Nov. 15, 2018, the disclosure of which is incorporated by reference herein in its entirety.

BACKGROUND

1. Field

The present disclosure relates to the technical field of text processing, and more particularly, relates to a method and a device for selecting a text in an electronic terminal.

2. Description of Related Art

With the development of electronic technology, the electronic terminal plays a more and more important role in our daily life. One can carry out activities using an electronic terminal, such as shopping, browsing web pages, socializing, photographing, reading various electronic documents, and the like. When a text is displayed on a screen of the electronic terminal, a user may enter a text selection mode by long pressing the screen displaying a text region, and in the text selection mode, a widget for selecting a text will be provided. When there are a comparatively large number of texts that the user needs to select, a long-distance drag needs to be performed on the current widget, and the operation is not simple or convenient.

The present disclosure aims to provide a method and a device for selecting a text in an electronic terminal so as to solve the problem that the operation is not simple or convenient with the existing text selection manner.

SUMMARY

One aspect of the present disclosure provides a method for selecting a text in an electronic terminal, the method including: receiving an operation for entering a text selection mode and entering the text selection mode; displaying a start marker for indicating a start position of the selected text, an end marker for indicating an end position of the selected text, a start guideline and an end guideline, wherein the start guideline refers to a straight line passing through the start position and extending along a character direction in the text within a predetermined range, and the end guideline refers to a straight line passing through the end position and extending along a character direction in the text within a predetermined range; changing the start position or the end position according to operations of a user on the start guideline or the end guideline.

Alternatively, the straight line passes through a text display window for displaying a text, or only passes through a region displaying a text on the text display window.

Alternatively, when a drag operation of the user on any position of the start guideline is received, the start position is changed to be a position where the drag operation ends; when a drag operation of the user on any position of the end guideline is received, the end position is changed to be a position where the drag operation ends.

Alternatively, when a touch operation of the user on any position of the start guideline is received, the start position is changed to be a position of the touch operation on the start guideline; when a touch operation of the user on a predetermined position of the end guideline is received, the end position is changed to be a position of the touch operation on the end guideline.

Alternatively, when a touch operation of the user on any position of the start guideline is received, and a position of the touch operation is moved, a position of the start guideline in a direction vertical to a character direction is changed to be a position of the touch operation in a direction vertical to the character direction, and the start position is changed to be the position of the touch operation; when a touch operation of the user on any position of the end guideline is received, and a position of the touch operation is moved, a position of the end guideline in a direction vertical to a character direction is changed to be a position of the touch operation in a direction vertical to the character direction, and the end position is changed to be the position of the touch operation.

Alternatively, in the text selection mode, the start guideline and the end guideline are always displayed; or, only when the start position is rolled outside the screen, the start guideline is displayed, and only when the end position is rolled outside the screen, the end guideline is displayed.

Alternatively, the method further includes: when the start marker is not displayed in the screen, receiving a predetermined operation of the user on the start guideline, and in response to the predetermined operation of the user on the start guideline, rolling the text displayed in the screen to a position where the start marker is, so as to display the start marker in the screen; and when the end marker is not displayed in the screen, receiving a predetermined operation of the user on the end guideline, and in response to the predetermined operation of the user on the start guideline, rolling the text displayed in the screen to a position where the end marker is, so as to display the end marker in the screen.

Alternatively, the method further includes: when a portion of text or the full text in the selected text is not displayed in the screen, displaying a thumbnail of the whole page on the text displayed in the screen.

Alternatively, the method further includes: displaying a widget for positioning a text displayed in the screen in the thumbnail, and when an operation for moving the widget is received, changing the text displayed in the screen to be the text at the position where the widget is.

Alternatively, the widget is a frame having the same shape as the screen, and the text in the frame is the same as the text displayed in the screen.

Alternatively, the method further includes: when the operation of the user on the start guideline or the end guideline ends, providing an option for processing the selected text to the user.

Alternatively, the processing includes at least one of: copying, editing, annotating, cutting, sharing and translating.

Another aspect of the present disclosure provides a device for selecting a text in an electronic terminal, the device including: an input interface; a processor configured to receive an operation for entering a text selection mode through the input interface, and enter the text selection mode; and a displayer displaying, under the control of the processor, a start marker for indicating a start position of the selected text, an end marker for indicating an end position of the selected text, a start guideline and an end guideline, wherein the start guideline refers to a straight line passing through the start position and extending along a character direction in the text within a predetermined range, and the end guideline refers to a straight line passing through the end position and extending along a character direction in the text within a predetermined range, wherein the processor is further configured to change the start position or the end position according to operations of a user on the start guideline or the end guideline.

Alternatively, the straight line passes through a text display window for displaying a text, or only passes through a region displaying a text on the text display window.

Alternatively, the processor is further configured to, when a drag operation of the user on any position of the start guideline is received through the input interface, change the start position to be a position where the drag operation ends, and when a drag operation of the user on any position of the end guideline is received, change the end position to be a position where the drag operation ends.

Alternatively, the processor is further configured to, when a touch operation of the user on any position of the start guideline is received through the input interface, change the start position to be a position of the touch operation on the start guideline, and when a touch operation of the user on a predetermined position of the end guideline is received, change the end position to be a position of the touch operation on the end guideline.

Alternatively, the processor is further configured to, when a touch operation of the user on any position of the start guideline is received through the input interface, and a position of the touch operation is moved, change a position of the start guideline in a direction vertical to a character direction to be a position of the touch operation in a direction vertical to the character direction and change the start position to be the position of the touch operation, and when a touch operation of the user on any position of the end guideline is received through the input interface, and a position of the touch operation is moved, change a position of the end guideline in a direction vertical to a character direction to be a position of the touch operation in a direction vertical to the character direction and change the end position to be the position of the touch operation.

Alternatively, the processor is further configured to, in the text selection mode, control the display to always display the start guideline and the end guideline; or, only when the start position is rolled outside the screen, control the displayer to display the start guideline, and only when the end position is rolled outside the screen, display the end guideline.

Alternatively, the processor is further configured to, when the start marker is not displayed in the screen, receive a predetermined operation of the user on the start guideline through the input interface, and in response to the predetermined operation of the user on the start guideline, roll the text displayed in the screen to a position where the start marker is, so as to display the start marker in the screen, and when the end marker is not displayed in the screen, receive a predetermined operation of the user on the end guideline through the input interface, and in response to the predetermined operation of the user on the start guideline, roll the text displayed in the screen to a position where the end marker is, so as to display the end marker in the screen.

Alternatively, the processor is further configured to, when a portion of text or the full text in the selected text is not displayed in the screen, control the displayer to display a thumbnail of the whole page on the text displayed in the screen.

Alternatively, the processor is further configured to control the displayer to display a widget for positioning a text displayed in the screen in the thumbnail, and when an operation for moving the widget is received through the input interface, change the text displayed in the screen to be the text at the position where the widget is.

Alternatively, the widget is a frame having the same shape as the screen, and the text in the frame is the same as the text displayed in the screen.

Alternatively, the processor is further configured to, when the operation of the user on the start guideline or the end guideline ends, control the displayer to provide an option for processing the selected text to the user.

Alternatively, the processing includes at least one of: copying, editing, annotating, cutting, sharing and translating.

Another aspect of the present disclosure provides a computer-readable storage medium, and the computer-readable storage medium stores a program instruction that enables the processor to execute the method of selecting a text in an electronic terminal as mentioned above while being executed by the processor.

In the method and device for selecting a text in an electronic terminal according to embodiments of the present disclosure, a user may perform operations on the start guideline and the end guideline to select a text, and the operations are simpler and more convenient.

Other aspects and/or advantages of the present disclosure will be partially illustrated in the following description, and the rest will be clarified through further description or implementation of the present disclosure.

BRIEF DESCRIPTION OF THE DRAWINGS

The above and other destinations, features and advantages will become more apparent from the following detailed description, taken in conjunction with the accompanying drawings in which.

DETAILED DESCRIPTION

Embodiments of the present disclosure will be described in detail below by referring to the accompany drawings.

Figure 1:
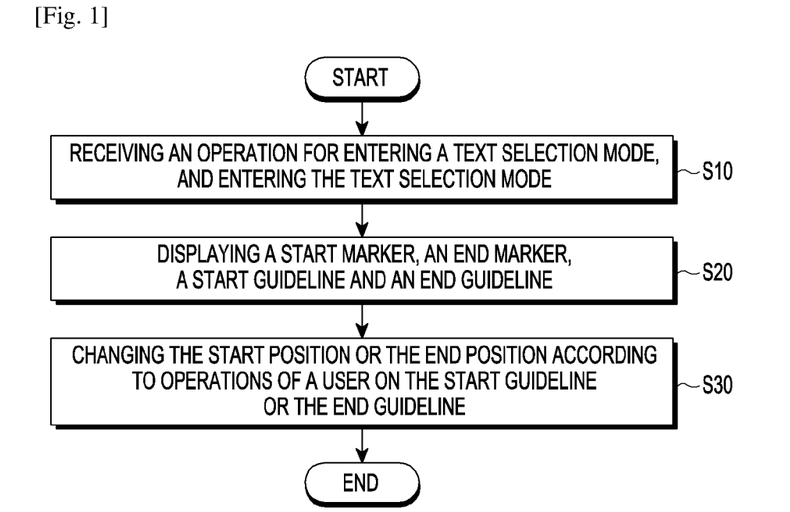
FIG. 1 is a flowchart illustrating a method for selecting a text in an electronic terminal according to an embodiment of the present disclosure.

FIG. 1 is a flowchart illustrating a method for selecting a text in an electronic terminal according to an embodiment of the present disclosure. The method for selecting a text in an electronic terminal according to an embodiment of the present disclosure may be applied in various electronic devices, such as, a mobile communication terminal, a personal computer, a tablet computer, a game machine, a digital multimedia player and so on.

In step S10, an operation for entering a text selection mode is received, and the text selection mode is entered.

Here, the operation for entering the text selection mode may be various touch inputs or voice inputs or the like input by a user. For example, the operation for entering the text selection mode may be a long pressing operation of the user on a region where the text is displayed in the screen.

In step S20, a start marker for indicating a start position of the selected text, an end marker for indicating an end position of the selected text, a start guideline and an end guideline are displayed.

After entering the text selection mode, an initial position of the start position and an initial position of the end position may be default positions or be determined according to the above operations for entering the text selection mode. For example, in the case where the operation for entering the text selection mode is a long pressing operation of the user on a region where the text is displayed in the screen, the initial position of the start position and the initial position of the end position may be positions where the long pressing operation is located, and the initial position of the start position and the initial position of the end position may be separated with one character.

The start marker may be a vertical bar displayed at the start position, and the end marker may be a vertical bar displayed at the end position. It should be understood that the start marker and the end marker according to an embodiment of the present disclosure may also be other forms.

The start guideline refers to a straight line passing through the start position and extending along a character direction in the text within a predetermined range. The end guideline refers to a straight line passing through the end position and extending along a character direction in the text within a predetermined range. The predetermined range may be a text display window for displaying a text in the screen, and may also be a region displaying a text on the text display window. That is to say, the above straight line passes through a text display window for displaying a text, or only passes through a region displaying a text on the text display window.

The start guideline and the end guideline are used for selecting texts. In particular, the start guideline is used for changing the start position of the selected text, and the end guideline is used for changing the end position of the selected text.

Alternatively, apart from being used for indicating a start position or an end position of the selected text, the start marker or the end marker may also be used for selecting a text.

In the text selection mode, the start guideline and the end guideline may always be displayed. In addition, in the case where the start marker and the end marker are also used for selecting a text, it could also be that, only when the start position is rolled outside the screen (i.e., the start marker is not displayed in the screen), the start guideline is displayed, and only when the end position is rolled outside the screen (i.e., the end marker is not displayed in the screen), the end guideline is displayed. Here, the start position or the end position may be rolled outside the screen in the process of rolling or page-turning of characters displayed in the screen.

Here, when the start marker is not displayed in the screen, a predetermined operation of the user on the start guideline may be received, and in response to the predetermined operation of the user on the start guideline, the text displayed in the screen is rolled to a position (i.e., the start position of the selected text) where the start marker is, so as to display the start marker in the screen. The predetermined operation may be various operations performed by the user on the start guideline, and a double-click is preferred. In this way, the text displayed in the screen may be quickly positioned to be a text at the start position of the selected text through the start guideline.

When the end marker is not displayed in the screen, a predetermined operation of the user on the end guideline is received, and in response to the predetermined operation of the user on the start guideline, the text displayed in the screen is rolled to a position (i.e., the end position of the selected text) where the end marker is, so as to display the end marker in the screen. The predetermined operation may be various operations performed by the user on the end guideline, and a double-click is preferred. In this way, the text displayed in the screen may be quickly positioned to be a text at the end position of the selected text through the end guideline.

Figure 2:
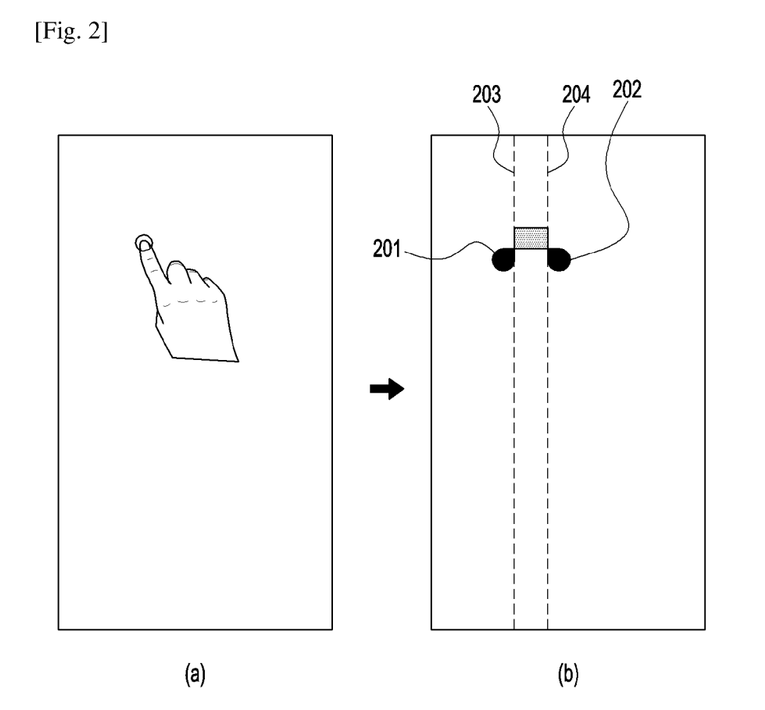
FIG. 2 is an example illustrating an interface of entering a text selection mode according to an embodiment of the present disclosure.

FIG. 2 is an example illustrating an interface of entering a text selection mode according to an embodiment of the present disclosure.

As illustrated in 2a of FIG. 2, a long pressing operation of a user on a certain region in a region displaying a text is received, and a text selection mode is entered, a screen interface will be converted into what is illustrated in 2b of FIG. 2, and a start marker 201, an end marker 202, a start guideline 203 and an end guideline 204 are displayed in the interface.

In step S30, the start position or the end position is changed according to operations of the user on the start guideline or the end guideline. That is to say, when an operation of the user on the start guideline or the end guideline is received, the start position and the end position of the selected text are changed according to received operations.

Since the start guideline or the end guideline at least passes through the region displaying a text on the screen, no matter how far the start position or the end position of a text that needs to be selected is away from the initial position of the start position or the end position, the user may select a text by operating the start guideline or the end guideline conveniently.

As an example, the operation performed on the start guideline or the end guideline may be a drag operation. When a drag operation of the user on any position of the start guideline is received, the start position is changed to be a position where the drag operation ends; when a drag operation of the user on any position of the end guideline is received, the end position is changed to be a position where the drag operation ends.

In one example, the position of the start position or the end position may be changed at the end of the drag operation.

In another example, the position of the start position or the end position may also be changed along with the change of the position of the drag operation in the process of the drag operation.

For example, when a touch operation (e.g., a click operation) of the user on any position of the start guideline is received, the start position is changed to be a position of the touch operation on the start guideline; when a touch operation of the user on a predetermined position of the end guideline is received, the end position is changed to be a position of the touch operation on the end guideline.

When a touch operation of the user on any position of the start guideline is received, and a position of the touch operation is moved (i.e., a drag operation of the user on any position of the start guideline is received), a position of the start guideline in a direction vertical to a character direction is changed to be a position of the touch operation in a direction vertical to the character direction, and the start position is changed to be the position of the touch operation.

When a touch operation of the user on any position of the end guideline is received, and a position of the touch operation is moved (i.e., a drag operation of the user on any position of the end guideline is received), a position of the end guideline in a direction vertical to a character direction is changed to be a position of the touch operation in a direction vertical to the character direction, and the end position is changed to be the position of the touch operation.

Figure 3:
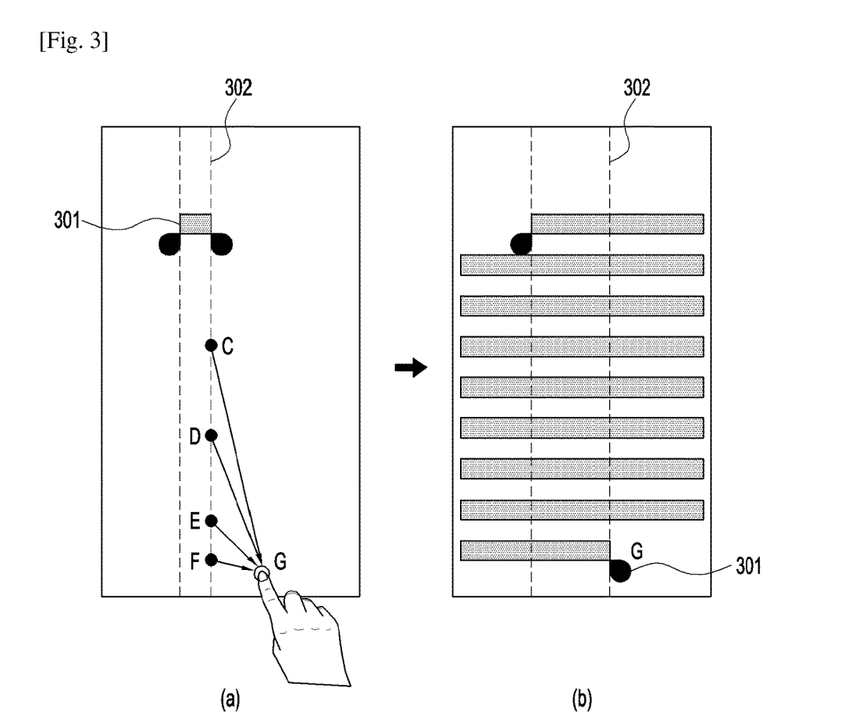
FIGS. 3 and 4 are examples illustrating interfaces of selecting a text according to embodiments of the present disclosure.

FIG. 3 is an example illustrating an interface of selecting a text according to an embodiment of the present disclosure.

As illustrated in 3a of FIG. 3, after a drag operation of the user on any position (e.g., position C, position D, position E or position F) on an end guideline 302, a position when the drag operation ends is G, the screen interface will be converted into what is illustrated in 3b of FIG. 3, the end position is changed to be the position G when the drag operation ends, an end marker 301 is displayed at the position G, and a position of the end guideline 302 is also changed.

Figure 4:
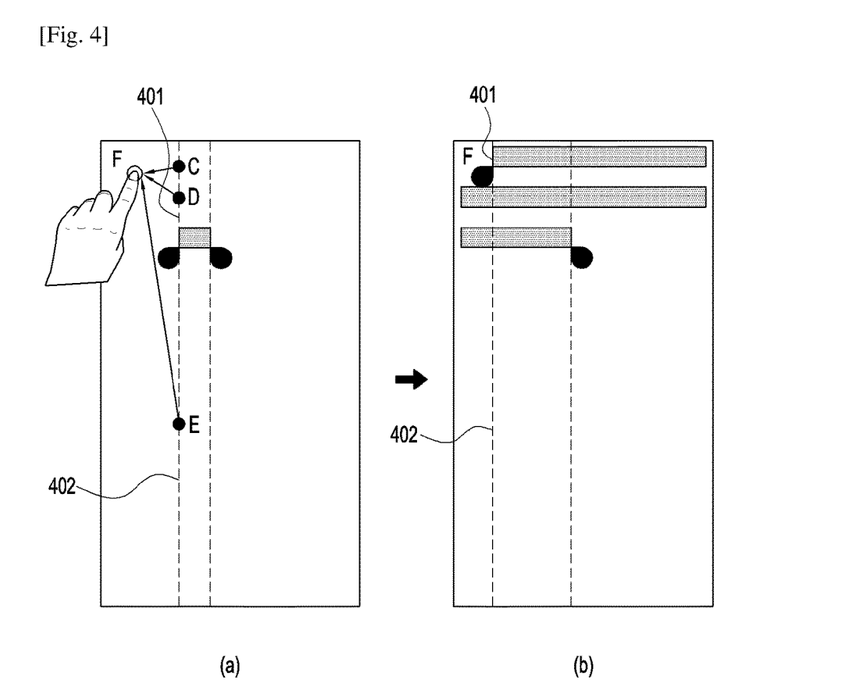

FIG. 4 is an example illustrating another interface of selecting a text according to an embodiment of the present disclosure.

As illustrated in 4a of FIG. 4, after a drag operation of the user on any position (e.g., position C, position D or position E) on a start guideline 402, a position when the drag operation ends is F, the screen interface will be converted into what is illustrated in 4b of FIG. 4, the end position is changed to be the position F when the drag operation ends, an end marker 401 is displayed at the position F, and a position of the start guideline 402 is also changed.

Preferably, when a portion of text or the full text in the selected text is not displayed in the screen caused by rolling or page turning performed on the text displayed in the screen, a thumbnail of the whole page is displayed on the text displayed in the screen. That is to say, a thumbnail of pages including all texts that may be displayed in the screen through a rolling operation is displayed in the screen, so as to facilitate user's viewing on selected texts.

Preferably, a widget for positioning the text displayed in the screen may also be displayed in the thumbnail, and the widget may also be used for reflecting the position of the text displayed in the screen in the whole page.

When an operation for moving the widget is received, the text displayed in the screen is changed to be the text at the position where the widget is.

The widget may be various widgets that may position texts. The widget is preferably a frame having the same shape as the screen, and the text in the frame is the same as the text displayed in the screen. The frame may be a dashed frame.

Figure 5:
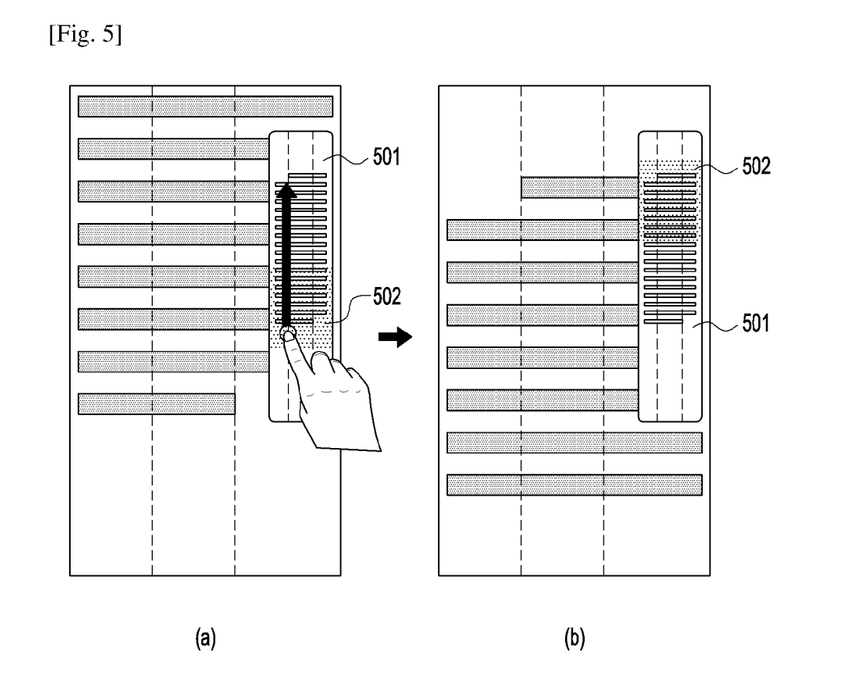
FIG. 5 is an example illustrating an interface where a portion of text is not displayed in the screen according to an embodiment of the present disclosure.

FIG. 5 is an example illustrating an interface where a portion of text is not displayed in the screen according to an embodiment of the present disclosure.

As illustrated in 5a of FIG. 5, a portion of text in the selected text is not displayed in the screen, a thumbnail 501 of the whole page is displayed on the text displayed in the screen, and a dashed frame 502 positioned in the text displayed in the screen is displayed in the thumbnail 501; when the user moves the dashed frame 502 upward, the interface in the screen is changed into what is illustrated in 5b of FIG. 5, and the text displayed in the screen is changed to be the text at the position where the dashed frame 502 is.

Moreover, in order to facilitate user's processing on the selected text, an option for processing the selected text is provided to the user when the operation of the user on the start guideline or the end guideline ends. For example, a menu including the option of processing the selected text may pop out in the screen. The processing may include at least one of: copying, editing, annotating, cutting, sharing and translating.

Figure 6:
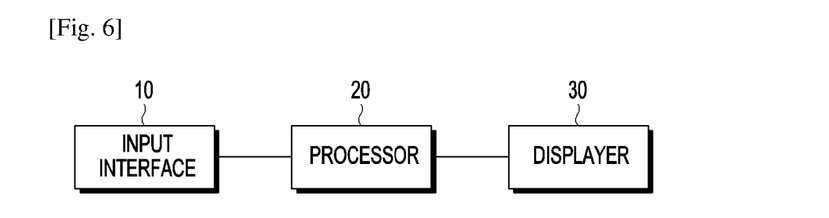
FIG. 6 is a block diagram of a device for selecting a text in an electronic terminal according to an embodiment of the present disclosure.

FIG. 6 is a block diagram of a device for selecting a text in an electronic terminal according to an embodiment of the present disclosure. As an example, the electronic terminal may be various electronic devices, such as, a mobile communication terminal, a personal computer, a tablet computer, a game machine, a digital multimedia player and so on.

As illustrated in FIG. 6, the device for selecting a text in an electronic terminal according to an embodiment of the present disclosure includes an input interface 10, a processor 20 and a displayer 30. Here, the input interface 10 and the displayer 30 may respectively be independent components that are capable of realizing a display function and an input function. As an example, the input interface 10 may be input devices such as a keyboard, a touch screen, and a roller. Apart from that, the input interface 10 and the displayer 30 may also be integrated to be a touch screen so as to realize display and input functions at the same time.

The processor 20 receives an operation for entering a text selection mode through the input interface 10, and enters the text selection mode.

Here, the operation for entering the text selection mode may be various touch inputs or voice inputs or the like input by a user. For example, the operation for entering the text selection mode may be a long pressing operation of the user on a region where the text is displayed in the screen of the displayer.

After entering the text selection mode, the processor 20 controls the displayer 30 to display a start marker for indicating a start position of the selected text, an end marker for indicating an end position of the selected text, a start guideline and an end guideline.

After entering the text selection mode, an initial position of the start position and an initial position of the end position may be default positions or be determined according to the above operations for entering the text selection mode. For example, in the case where the operation for entering the text selection mode is a long pressing operation of the user on a region where the text is displayed in the screen, the initial position of the start position and the initial position of the end position may be the positions where the long pressing operation is, and the initial position of the start position and the initial position of the end position may be separated with one character.

The start marker may be a vertical bar displayed at the start position, and the end marker may be a vertical bar displayed at the end position. It should be understood that the start marker and the end marker according to an embodiment of the present disclosure may also be other forms.

The start guideline refers to a straight line passing through the start position and extending along a character direction in the text within a predetermined range. The end guideline refers to a straight line passing through the end position and extending along a character direction in the text within a predetermined range. The predetermined range may be a text display window for displaying a text in the screen, and may also be a region displaying a text on the text display window. That is to say, the above straight line passes through a text display window for displaying a text, or only passes through a region displaying a text on the text display window.

The start guideline and the end guideline are used for selecting texts. In particular, the start guideline is used for changing the start position of the selected text, and the end guideline is used for changing the end position of the selected text.

Alternatively, apart from being used for indicating a start position or an end position of the selected text, the start marker or the end marker may also be used for selecting a text.

In the text selection mode, the start guideline and the end guideline may always be displayed. In addition, in the case where the start marker and the end marker are also used for selecting a text, it could also be that, only when the start position is rolled outside the screen (i.e., the start marker is not displayed in the screen), the start guideline is displayed, and only when the end position is rolled outside the screen (i.e., the end marker is not displayed in the screen), the end guideline is displayed. Here, the start position or the end position may be rolled outside the screen in the process of rolling or page-turning of characters displayed in the screen.

Here, when the start marker is not displayed in the screen, the processor 20 may receive a predetermined operation of the user on the start guideline through the input interface 10, and in response to the predetermined operation of the user on the start guideline, roll the text displayed in the screen to a position (i.e., the start position of the selected text) where the start marker is, so as to display the start marker in the screen. The predetermined operation may be various operations performed by the user on the start guideline, and a double-click is preferred. In this way, the text displayed in the screen may be quickly positioned to be a text at the start position of the selected text through the start guideline.

When the end marker is not displayed in the screen, the processor 20 may receive a predetermined operation of the user on the end guideline through the input interface 10, and in response to the predetermined operation of the user on the start guideline, roll the text displayed in the screen to a position (i.e., the end position of the selected text) where the end marker is, so as to display the end marker in the screen. The predetermined operation may be various operations performed by the user on the end guideline, and a double-click is preferred. In this way, the text displayed in the screen may be quickly positioned to be a text at the end position of the selected text through the end guideline.

Since the start guideline or the end guideline at least passes through the region displaying a text on the screen, no matter how far the start position or the end position of a text that needs to be selected is away from the initial position of the start position or the end position, the user may select a text by operating the start guideline or the end guideline conveniently.

As an example, the operation performed on the start guideline or the end guideline may be a drag operation. When receiving a drag operation of the user on any position of the start guideline through the input interface 10, the processor 20 changes the start position to be a position where the drag operation ends, and when receiving a drag operation of the user on any position of the end guideline through the input interface 10, the processor 20 changes the end position to be a position where the drag operation ends.

In one example, the position of the start position or the end position may be changed at the end of the drag operation.

In another example, the position of the start position or the end position may also be changed along with the change of the position of the drag operation in the process of the drag operation.

For example, when receiving a touch operation (e.g., a click operation) of the user on any position of the start guideline through the input interface 10, the processor 20 changes the start position to be a position of the touch operation on the start guideline; when receiving a touch operation of the user on a predetermined position of the end guideline through the input interface 10, the processor 20 changes the end position to be a position of the touch operation on the end guideline.

When receiving a touch operation of the user on any position of the start guideline through the input interface 10 and moving a position of the touch operation (i.e., receiving a drag operation of the user on any position of the start guideline), the processor 20 changes a position of the start guideline in a direction vertical to a character direction to be a position of the touch operation in a direction vertical to the character direction, and changes the start position to be the position of the touch operation.

When receiving a touch operation of the user on any position of the end guideline through the input interface 10 and moving a position of the touch operation (i.e., receiving a drag operation of the user on any position of the end guideline), the processor 20 changes a position of the end guideline in a direction vertical to a character direction to be a position of the touch operation in a direction vertical to the character direction, and changes the end position to be the position of the touch operation.

Preferably, when a portion of text or the full text in the selected text is not displayed in the screen caused by rolling or page turning performed on the text displayed in the screen, the processor 20 controls the displayer 30 to display a thumbnail of the whole page on the text displayed in the screen. That is to say, a thumbnail of pages including all texts that may be displayed in the screen through a rolling operation is displayed in the screen, so as to facilitate user's viewing on selected texts.

Preferably, the processor 20 may also control the displayer 30 to display a widget for positioning the text displayed in the screen in the thumbnail, and the widget may also be used for reflecting the position of the text displayed in the screen in the whole page.

When receiving an operation for moving the widget through the input interface 10, the processor 20 changes the text displayed in the screen to be the text at the position where the widget is.

The widget may be various widgets that may position texts. The widget is preferably a frame having the same shape as the screen, and the text in the frame is the same as the text displayed in the screen. The frame may be a dashed frame.

Moreover, in order to facilitate user's processing on the selected text, when the operation of the user on the start guideline or the end guideline ends, the processor 20 controls the displayer 30 to provide an option for processing the selected text to the user. For example, a menu including the option of processing the selected text may pop out in the screen. The processing may include at least one of: copying, editing, annotating, cutting, sharing and translating.

In the method and device for selecting a text in an electronic terminal according to embodiments of the present disclosure, a user may perform operations on the start guideline and the end guideline to select a text, and the operations are simpler and more convenient.

A computer-readable storage medium is also provided according to an embodiment of the present disclosure. The computer-readable storage medium stores a program instruction that enables the processor to execute the method for selecting a text in an electronic terminal as mentioned above while being executed by the processor. The computer-readable recording medium is a storage device that may store any data of data read out by a computer system. Examples of the computer-readable recording medium include: a read-only memory, a random-access memory, a magnetic tape, a floppy disk, an optical data storage device and a carrier (such as data transmission via Internet through a wired or wireless transmission path). The computer-readable recording medium may also be distributed in a computer system connected to network so that computer-readable codes are stored and executed in a distributed manner. In addition, the functional program, code and code segment for completing the present disclosure may easily be interpreted within the scope of the present disclosure by general programmers in the field related to the present disclosure.

Even if the present disclosure has been particularly shown and described with reference to exemplary embodiments thereof, it shall be understood by those skilled in the art that various changes in form and details may be made therein without departing from the spirit and scope of the present disclosure as defined by the claims.

The invention claimed is:

1. A method for selecting a text in an electronic terminal, comprising:
   receiving a user input for entering a text selection mode, and entering the text selection mode;
   displaying a start marker for indicating a start position of a selected text in the text selection mode, an end marker for indicating an end position of the selected text, a start guideline and an end guideline, wherein the start guideline refers to a first straight line passing through the start position and extending along a first character direction in the selected text within a first predetermined range, and the end guideline refers to a second straight line passing through the end position and extending along a second character direction in the selected text within a second predetermined range; and
   changing the start position or the end position according to operations of a user on the start guideline or the end guideline,
   wherein when a first drag operation of the user on any position of the start guideline is received, the start position is changed to be a position where the first drag operation ends; and
   when a second drag operation of the user on any position of the end guideline is received, the end position is changed to be a position where the second drag operation ends.

2. The method of claim 1, wherein the first straight line and the second straight line pass through a text display window for displaying a text, or only passes through a region displaying a text on the text display window.

3. The method of claim 1, wherein when a first touch operation of the user on any position of the start guideline is received, the start position is changed to be a position of the first touch operation on the start guideline, and when a second touch operation of the user on a predetermined position of the end guideline is received, the end position is changed to be a position of the second touch operation on the end guideline.

4. The method of claim 3, wherein when a third touch operation of the user on any position of the start guideline is received, and a position of the third touch operation is moved, a position of the start guideline in a direction vertical to a character direction is changed to be a position of the third touch operation in a direction vertical to the character direction, and the start position is changed to be a position of the third touch operation; and
   when a fourth touch operation of the user on any position of the end guideline is received, and a position of the fourth touch operation is moved, a position of the end guideline in a direction vertical to a character direction is changed to be a position of the fourth touch operation in a direction vertical to the character direction, and the end position is changed to be a position of the fourth touch operation.

5. The method of claim 1, wherein, in the text selection mode, the start guideline and the end guideline are always displayed; or, only when the start position is rolled outside a screen, the start guideline is displayed, and only when the end position is rolled outside the screen, the end guideline is displayed.

6. The method of claim 5, wherein the method further comprises:
   when the start marker is not displayed in the screen, receiving a first predetermined operation of the user on the start guideline, and in response to the first predetermined operation of the user on the start guideline, rolling the text displayed in the screen to a position where the start marker is, so as to display the start marker in the screen; and
   when the end marker is not displayed in the screen, receiving a second predetermined operation of the user on the end guideline, and in response to the second predetermined operation of the user on the end guideline, rolling the text displayed in the screen to a position where the end marker is, so as to display the end marker in the screen.

7. The method of claim 1, wherein the method further comprises: when a portion of text or a full text in the selected text is not displayed in a screen, displaying a thumbnail of a whole page on a text displayed in the screen.

8. A device for selecting a text in an electronic terminal, comprising:
   an input interface;
   a processor configured to receive a user input for entering a text selection mode through the input interface, and enter the text selection mode; and
   a displayer displaying, under a control of the processor, a start marker for indicating a start position of a selected text in the text selection mode, an end marker for indicating an end position of the selected text, a start guideline which refers to a first straight line passing through the start position and extending along a first character direction in the selected text within a first predetermined range, and an end guideline which refers to a second straight line passing through the end position and extending along a second character direction in the selected text within a second predetermined range,
   wherein the processor is further configured to change the start position or the end position according to operations of a user on the start guideline or the end guideline,
   wherein when a first drag operation of the user on any position of the start guideline is received, the start position is changed to be a position where the first drag operation ends; and
   when a second drag operation of the user on any position of the end guideline is received, the end position is changed to be a position where the second drag operation ends.

9. The device of claim 8, wherein the first straight line and the second straight line pass through a text display window for displaying a text, or only passes through a region displaying a text on the text display window.

10. The device of claim 8, wherein when a first touch operation of the user on any position of the start guideline is received, the start position is changed to be a position of the first touch operation on the start guideline, and when a second touch operation of the user on a predetermined position of the end guideline is received, the end position is changed to be a position of the second touch operation on the end guideline.

11. The device of claim 10, wherein when a third touch operation of the user on any position of the start guideline is received, and a position of the third touch operation is moved, a position of the start guideline in a direction vertical to a character direction is changed to be a position of the third touch operation in a direction vertical to the character direction, and the start position is changed to be a position of the third touch operation; and when a fourth touch operation of the user on any position of the end guideline is received, and a position of the fourth touch operation is moved, a position of the end guideline in a direction vertical to a character direction is changed to be a position of the fourth touch operation in a direction vertical to the character direction, and the end position is changed to be a position of the fourth touch operation.

12. The device of claim 8, wherein, in the text selection mode, the start guideline and the end guideline are always displayed; or, only when the start position is rolled outside a screen, the start guideline is displayed, and only when the end position is rolled outside the screen, the end guideline is displayed.

13. The device of claim 12, wherein the processor is further configured to:

when the start marker is not displayed in the screen, receive a first predetermined operation of the user on the start guideline, and in response to the first predetermined operation of the user on the start guideline, roll the text displayed in the screen to a position where the start marker is, so as to display the start marker in the screen; and when the end marker is not displayed in the screen, receive a second predetermined operation of the user on the end guideline, and in response to the second predetermined operation of the user on the end guideline, roll the text displayed in the screen to a position where the end marker is, so as to display the end marker in the screen.

14. The device of claim 8, wherein the processor is further configured to: when a portion of text or a full text in the selected text is not displayed in a screen, display a thumbnail of a whole page on a text displayed in the screen.

* * * * *